United States Patent Office 3,824,250
Patented July 16, 1974

3,824,250
1-MESITYL-3-SUBSTITUTED PYRAZOLONES AS MAGENTA COLOR COUPLERS
Masao Sawahara and Kazuya Sano, Kanagawa, Japan, assignors to Fuji Photo Film Co., Ltd., Kanagawa, Japan
No Drawing. Filed Nov. 16, 1971, Ser. No. 199,337
Claims priority, application Japan, Nov. 16, 1970, 45/100,911
Int. Cl. C07d 49/14, 49/16
U.S. Cl. 260—310 A          9 Claims

ABSTRACT OF THE DISCLOSURE

Magenta color couplers of the formula

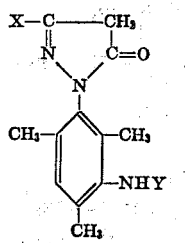

wherein X represents an acylamino group or an ethoxy group, Y represents a hydrogen atom or an acyl group, and one of X or Y has a ballasting group with 17 to 25 carbon atoms. A process for preparing such couplers.

BACKGROUND OF THE INVENTION

1. Field of the Invention

The present invention relates to novel magenta couplers and a method for the synthesis of such novel magenta couplers for color photography more particularly, a novel magenta coupler having methyl groups at the 2-, 4- and 6-positions of the 1-phenyl group of 1-phenyl-3-substituted pyrazolone.

2. Description of the Prior Art

It is generally known that among magenta couplers for color photography pyrazolone derivatives give a much faster dye than those obtained from other known magenta couplers such as cyanoacetyl coumarone and p-nitrobenzyl cyanide, and the absorption maximum of the dye produced is at a longer wave length side, i.e., it shows a larger amount of red-light absorption which is unnecessary, particularly for positive light-sensitive materials. If the pyrazolone is substituted at the 2- and 6-positions of the 1-phenyl group, the susceptibility of the coupler to light is reduced and if the substituents are electron releasing, the absorption maximum of the dye shifts to the shorter wave length side to reduce the red-light absorption. However, phenyl hydrazines having electron releasing groups are unstable. Phenyl hydrazines are employed as starting material for producing pyrazolone nuclei as follows:

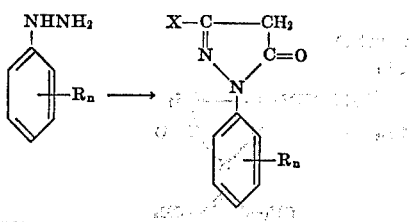

For instance, neither 2,4,6-trimethylphenyl hydrazine or 2,6-diethylphenyl aryl hydrazine which is the starting material of the pyrazolone, hydrazine can be readily isolated.

SUMMARY OF THE INVENTION

It is an object of this invention to provide a new compound having methyl groups at the 2-, 4-, and 6-positions of the 1-phenyl group of a 1-phenyl-3-substituted pyrazolone and a novel process for producing such a compound.

The inventors have discovered a method of producing such a novel compound having methyl groups at the 2-, 4-, and 6-positions of the 1-phenyl group as shown in the following general formula (I)

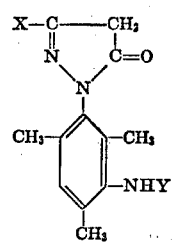

(I)

wherein X represents an acylamino group or an ethoxy group, Y represents a hydrogen atom or an acyl group, an either X and/or Y is substituted with a ballasting group having 17 to 25 carbon atoms.

Introduction of X and Y is performed by reaction of the amino pyrazolone with either acyl halide or acid anhydride, in a solvent such as acetonitrile, pyridine or acetic acid containing sodium acetate.

The starting materials for the ballast groups are synthesized according to U.S. Pats. 2,908,573 and 3,418,129. 2,4-di-tert-amylphenoxyacetic, and -butyric, acids are commercialy available from Eastman Kodak Co. The corresponding acid chlorides are obtained by refluxing with a large excess of thionyl chloride (3 to 5 moles) followed by distilling off the unreacted thionyl chloride.

This invention thus provides a method of synthesizing a novel magenta coupler wherein a nitro group, which is a strongly electro negative group, is introduced into the 3-position of 2,4,6-trimethylphenyl hydrazine, a pyrazolone is produced from the stabilized hydrazine, the nitro group thereof is reduced into an amino group or acylated into an acylamino group to weaken its electron acceptability, whereby the total effect is electron releasing due to the methyl groups.

DETAILED DESCRIPTION OF THE INVENTION

The compound of this invention represented by the general formula (I) mentioned above can be prepared by reducing the nitro group of 1-(3-nitro-2,4,6-trimethylphenyl)-3-acylamino-5-pyrazolone or 1-(3-nitro-2,4,6-trimethylphenyl)-3-ethoxy-5-pyrazolone to form 1-(3-amino-2,4,6-trimethylphenyl) - 3 - acylamino-5-pyrazolone or 1-(3-amino - 2,4,6 - trimethylphenyl)-3-ethoxy-5-pyrazolone or by further acrylating the amino group of the pyrazolone.

The words "ballasting group" is well known to those skilled in the art. The ballasting group is a group which renders the coupler undiffusible in a hydrophilic colloid layer and improves the solubility of the coupler in coupler solvents such as those described in U.S. Pat. 2,322,027.

A large variety of ballasting groups are well known in the coupler art. Generally the group contains a substituted phenyl group or a N-alkyl amido group. Examples are illustrated in U.S. Pat. 2,600,788, 2,908,573, 3,418,129, etc.

Preferred Examples are

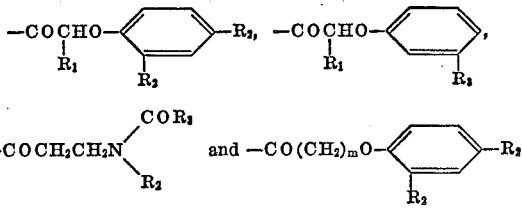

wherein $R_1$ represents a hydrogen atom or an alkyl group having not more than 3 carbon atoms, $R_2$ represents an alkyl group having not more than 5 carbon atoms, $R_3$ represents an alkyl group having from 5 to 16 carbon atoms, and $n$ is an integer from 1 to 5.

Although the preferred couplers have a ballasting group as defined above, the couplers of the present invention can have any of the ballasting groups used in the prior art couplers. The couplers are distinguished from the prior art couplers by having three methyl groups attached to the 2,4- and 6-positions of the 1-phenyl group or pyrazolone.

Examples of magneta couplers obtained by the method of this invention are illustrated below:

Compound 1

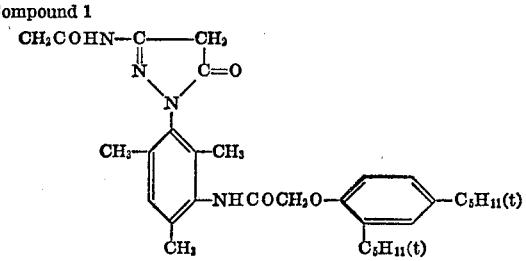

ompound 2

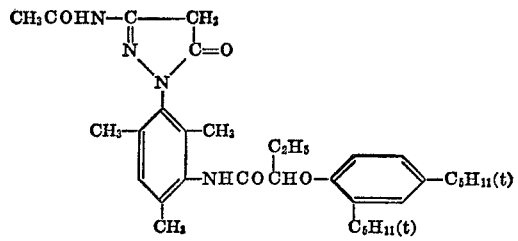

Compound 3

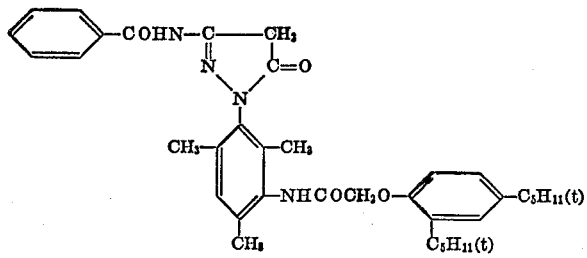

Compound 4

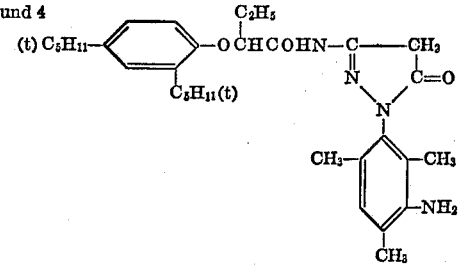

Compound 5

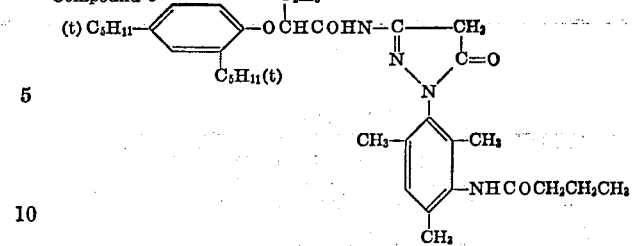

Compound 6

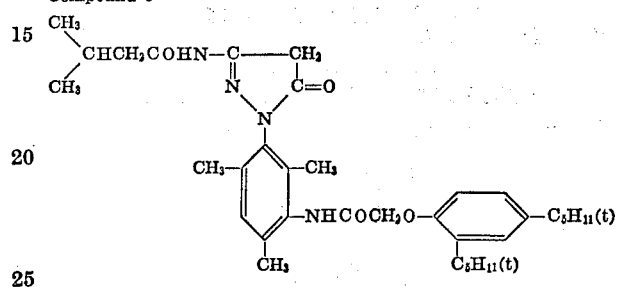

Compound 7

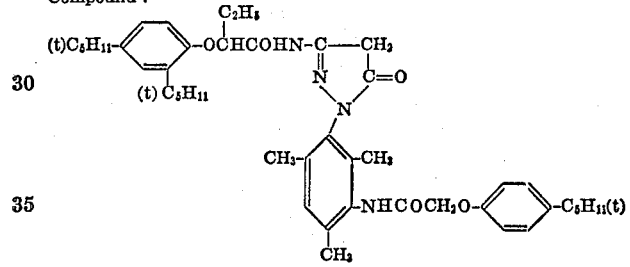

Compound 8

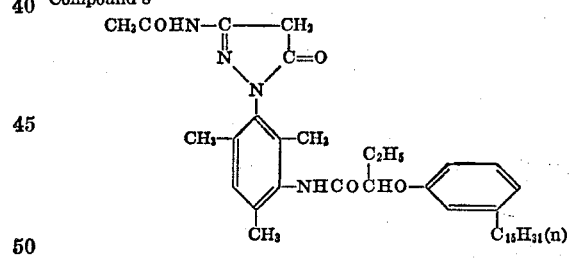

Compound 9

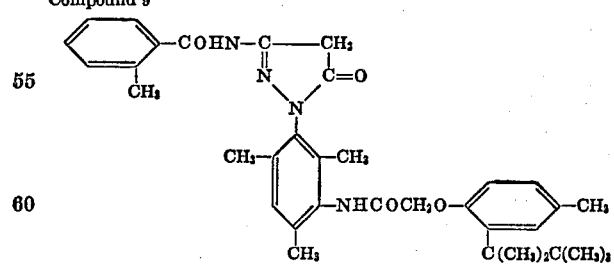

Compound 10

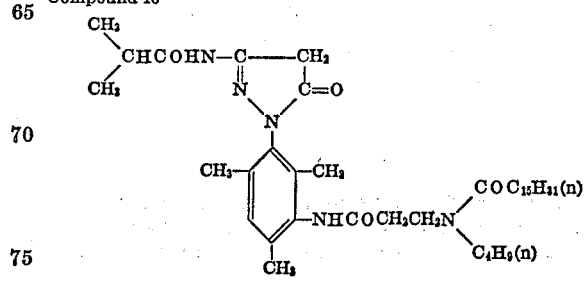

Compound 11

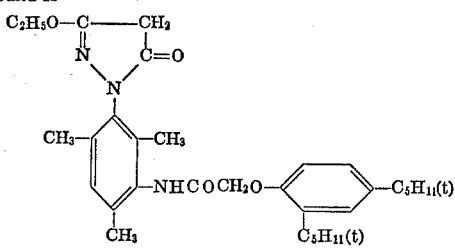

Compound 12

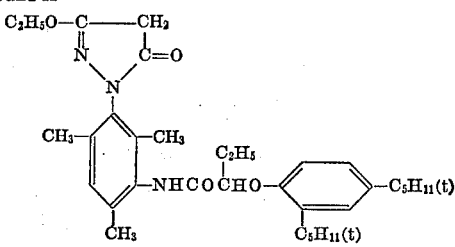

The synthesis procedures for the above-mentioned compounds by the method of this invention is explained by the following examples.

EXAMPLE 1 (SYNTHESIS OF COMPOUND 1)

(a) 3-nitro-2,4,6-trimethylphenyl hydrazine

Into a three liter three-necked flask equipped with a stirrer, a dropping funnel, and a thermometer there was placed 220 g. of 3-nitro-2,4,6-trimethylaniline (prepared by the method described in Ber., 24, page 570) and after adding thereto 300 ml. of distilled water and 1.2 liters of concentrated 35% hydrochloric acid, the mixture was stirred vigorously for 30 minutes and then cooled to 0° C. to —5° C. in a Dry-Ice bath. A solution of 92 g. of sodium nitrite in 250 ml. of distilled water was added to the mixture through the dropping funnel the end of which was beneath the surface level. The temperature was maintained below 0° C. and after finishing the addition mixture was stirred for 30 minutes followed by filtration under suction. Seven hundred g. of stannous chloride was dissolved in a mixture of liter of distilled water and 1.2 liters of concentrated 35% hydrochloric acid, and when the solution of the diazonium salt obtained above was quickly added to this solution with stirring after the addition of 5 kg. of crushed ice, crystals were precipitated. The system was stirred occasionally, allowed to stand for 2 hours, and the crystals were collected by filtration under suction. The solid product thus obtained was finely suspended into 4 liters of water. The aqueous system was rendered strongly alkaline by adding a 40% aqueous solution of sodium hydroxide, and after cooling the system to room temperature, the powders were collected by filtration under suction. The wet product thus obtained was dissolved in hot benzene. The benzene phase was separated from the aqueous phase, and was concentrated under reduced pressure to precipitate yellow crystals, which were recrystallized from methanol. The amount of the product thus obtained was 155 g. with a melting point of 141–142° C.

(b) 1-(3-nitro-2,4,6-trimethylphenyl)-3-amino-5-pyrazolone

In a two-liter three-necked flask equipped with a stirrer, a reflux condenser, and a thermometer there were placed 105 g. of the hydrochloride of ethyl β-ethoxy-β-iminopropionate and 600 ml. of methanol and the mixture was cooled with ice while stirring. Fifty g. of anhydrous sodium acetate maintained at a temperature below 10° C. was added to the mixture and then 50 g. of sodium bicarbonate and 100 g. of 3-nitro-2,4,6-trimethylphenyl hydrazine were added to the mixture. The resulting mixture was stirred for 2 hours at room temperature and for a further 30 minutes at 40° C. Thereafter a solution of 80 g. of sodium methylate in 600 ml. of methanol was added thereto and the mixture was refluxed for 2 hours. After the reaction was over, methanol was distilled away under reduced pressure and the residue obtained was dissolved in 800 ml. of cold water. The solution was washed with 400 ml. of ether, cooled with the addition of ice and acidified with 120 ml. glacial acetic acid to precipitate crystals, which were solution filtered and recrystallized from methanol. The amount of the product melting at 204–206° C. was 75 g.

Elemental analysis.—Calculated: C, 54.96%; H, 5.34%. Found: C, 54.94%; H, 5.48%.

(c) 1-(3-nitro-2,4,6-trimethylphenyl)-3-acetamido-5-5-pyrazolone

In a one-liter three-necked flask equipped with a stirrer and a reflux condenser there were added with stirring, 60 g. of 1-(3-nitro-2,4,6-trimethylphenyl)-3-amino-5-pyrazolone and 400 ml. of absolute acetonitrile, and after adding 22 g. of acetyl chloride, the resulting mixture was refluxed for 15 hours. After the reaction was over, the mixture was cooled, the crystals which precipitated were collected, and then dissolved in 400 ml. of 10% aqueous sodium hydroxide. The filtered solution was acidified by the addition of 80 ml. glacial acetic acid and the crystals precipitated were suction filtered and then recrystallized from ethanol. The product, melting at 218–218.5° C., amounted to 40 g.

(d) 1-(3-amino-2,4,6-trimethylphenyl)-3-acetamido-5-pyrazolone

Thirty g. of 1-(3-nitro-2,4,6-trimethylphenyl)-3-acetamido-5-pyrazolone and 400 ml. of ethanol were placed in an autoclave and after adding 1 g. of a palladium-carbon catalyst (containing 10% palladium) the mixture was shaken for 5 hours at 90° C. under a sufficient hydrogen pressure (30 kg./cm.$^2$) to permit the necessary amount of hydrogen to be absorbed (0.3 mole) cooling the reaction product system, the catalyst was filtered off and the filtrate was concentrated under a reduced pressure to precipitate crystals. After cooling, the crystals were suction filtered and recrystallized from a mixture of ethanol and chloroform (2:1). The amount of the product, melting at 229–230° C., was 21 g.

(e) 1-{3-[α-(2,4-di-t-amylphenoxy)butyramido]-2,4,6-trimethylphenyl}-3-acetamido-5-pyrazolone Into a 500 ml. three-necked flask equipped with a stirrer and a reflux condenser were placed 15 g. of 1-(3-amino - 2,4,6 - trimethylphenyl)-3-acetamido-5-pyrazolone, 200 ml. of absolute acetonitrile, and 50 ml. of acetic acid. Then, 19.5 g. of α-(2,4-di-t-phenoxy)butyryl chloride was added to the solution while it was warmed and the mixture was refluxed at 50° C. for 14 hours. After the reaction was over, the solvent was distilled off under reduced pressure and the residue was dissolved in 300 ml. of methanol. Thereafter, 50 ml. of a 10% aqueous sodium hydroxide solution was added to the solution and the mixture was stirred for one hour. The solution was poured into 1.5 liters of ice-cooled water containing 50 ml. of glacial acetic acid and the crystals precipitated were suction filtered. The crude product was dissolved in 300 ml. of ether and an aqueous phase formed which was separated away. The ether layer was dried over sodium sulfate, solid material was filtered away, and then the ether was distilled away from the filtrate. The residue was dissolved in hot n-hexane and the solution was allowed to cool to precipitate white crystals, which were suction filtered and recrystallized from a mixture of n-hexane and ethyl acetate (3:1). The amount of the product, melting at 151–153° C., amounted to 12 g.

Elemental analysis.—Calculated: C, 70.83%; H, 8.33%; N, 9.72%. Found: C, 70.70%; H, 8.36%; N, 9.36%.

EXAMPLE 2 (SYNTHESIS OF COMPOUND 3)

(a) 1-(3-nitro-2,4,6-trimethylphenyl)-
3-benzamido-5-pyrazolone

Thirty-nine g. of 1-(3-nitro-2,4,6-trimethylphenyl)-3-amino-5-pyrazolone and 25 g. of benzoyl chloride were refluxed for 8 hours in 500 ml. absolute acetonitrile. The crystals precipitated were cooled and collected by filtration under suction. The crystals were dissolved in 300 ml. of 10% aqueous sodium hydroxide and filtered. The product solution was acidified by the addition of 60 ml. glacial acetic acid and the crystals precipitated were collected and recrystallized from acetonitrile. The yield of the product, melting at 207–209° C., was 34 g.

(b) 1-(3-amino-2,4,6-trimethylphenyl)-
3-benzamido-5-pyrazolone

In a one-liter three-necked flask equipped with a stirrer and a reflux condenser were added 30 g. of 1-(3-nitro-2,4,6-trimethylphenyl)-3-benzamido-5-pyrazolone, 200 ml. of methanol, 200 ml. of glacial acetic acid, and 30 ml. of water.

Into this stirred, hot mixture, 30 g. of iron powder was slowly added. Thereafter, the system was refluxed for two hours. After the reaction was completed, the supernatant liquid was decanted to 1.5 liters of ice-water to precipitate crystals. The crystals were collected, dissolved in 300 ml. of a 10% aqueous sodium hydroxide solution, and then insoluble materials were separated therefrom. The filtrate was acidified by the addition of 70 ml. glacial acetic acid and the crystals precipitated were collected and recrystallized from a mixture of ethanol and isopropanol (1:1). The yield of the product, melting at 140–145° C., amounted to 15 g.

(c) 1-[3-(2,4-di-t-amylphenoxyacetamido)-2,4,6-
trimethylphenyl]-3-benzamido-5-pyrazolone A mixture of 7 g. of 1-(3-amino-2,4,6-trimethylphenyl)-3-benzamido-5-pyrazolone, 100 ml. of glacial acetic acid, and 2.1 g. of anhydrous sodium acetate was heated to 45–50° C. with stirring. A solution consisting of 6.6 g. of 2,4-di-t-amyl-phenoxyacetyl chloride and 25 ml. of glacial acetic acid was added, thereto. The mixture was stirred for two hours at 45–50° C. After the reaction was completed, the product was poured into one liter of ice-water and the crystals precipitated were collected by filtration under suction, washed with water, dried, and recrystallized from a mixture of ligroin and petroleum ether (2:1). The product amounted to 15 g. and melted at 218.5–219.5° C.

Elementaly analysis.—Calculated: C, 72.79%; H, 7.54%; N, 9.18%. Found: C, 72.75%; H, 7.41%; N, 9.08%.

EXAMPLE 3 (SYNTHESIS OF COMPOUND 4)

(a) 1-(3-nitro-2,4,6-trimethylphenyl)-3-[α-(2,4-
di-t-amylphenoxy)-butyramido]-5-pyrazolone Into a one-liter three-necked flask equipped with a stirrer and a reflux condenser were placed 40 g. of 1-(3-nitro-2,4,6-trimethyl - phenyl)-3-amino-5-pyrazolone and 500 ml. of water free acetonitrile (absolute acetonitrile) with stirring. 53 g. of α-(2,4-di-t-amyl-phenoxy)-butyryl chloride was added thereto and the mixture was refluxed for 12 hours. After the reaction was completed, acetonitrile was distilled off under reduced pressure and the residue was dissolved in 250 ml. of methanol with heating at 60° C. Sixteen g. of anhydrous sodium acetate was added to the solution, the mixture heated at 60° C. for 10 minutes and the product poured into 1.5 liters of ice-water. The crystals thus precipitated were collected by filtration under suction, washed with water, dried, and recrystallized from a mixture of n-hexane and a small amount of ethanol (10:1) and then from methanol. The amount of the product, which melts at 191–193° C., was 30 g.

(b) 1-(3-amino-2,4,6-trimethylphenyl)-3-[α-(2,4-
di-t-amylphenoxy)butyramido]-5-pyrazolone Into a one-liter three-necked flask equipped with a stirrer and a reflux condenser were placed 27 g. of 1-(3-nitro-2,4,6-trimethylphenyl) - 3 - [α - (2,4-di-t-amylphenoxy) butyramido]-5-pyrazolone, 220 ml. of methanol and 250 ml. of glacial acetic acid with stirring while heating at 60° C. to dissolve the solid components. Then, 30 g. of iron powder was gradually added to the solution and the solution refluxed for 2 hours. After the reaction was over, the liquid was decanted into 1.5 liters of ice-water and the crystals precipitated were collected by suction, washed with water, dried, and recrystallized from acetonitrile. The amount of the product, melting at 212–214° C. was 18 g.

Elemental analysis.—Calculated: C, 71.91%; H, 8.61%; N, 10.49%. Found: C, 72.28%; H, 8.82%; N, 10.39%.

EXAMPLE 4 (SYNTHESIS OF COMPOUND 5)

Synthesis of 1-(3-n-butyramido-2,4,6-trimethylphenyl)-
3-[α-(2,4-di-t-amylphenoxy)butyramido]-5-pyrazolone Into a 200 ml. three-necked flask equipped with a stirrer and a reflux condenser were placed 8 g. of the compound obtained in Example 3, and 100 ml. of glacial acetic acid. The mixture was heated to 45–50° C. to provide a clear solution. A solution of 1.7 g. of n-butyryl chloride, 1.6 g. of anhydrous sodium acetate and 10 ml. of glacial acetic acid were added to the solution and the resulting solution was stirred for 2 hours at 45–50° C. After the reaction was completed, the reaction product was poured into 500 ml. of ice-water and the crystals thus precipitated were collected by suction, washed with water, dried, and recrystallized from a mixture of acetonitrile and methanol (2:1). The amount of the product obtained was 6 g. and the melting point thereof was 240–243° C.

Elemental analysis.—Calculated: C, 71.52%; H, 8.61%; N, 9.27%. Found: C, 71.32%; H, 8.52%; N, 9.62%.

EXAMPLE 5 (SYNTHESIS OF COMPOUND 6)

(a) 1-(3-nitro-2,4,6-trimethylphenyl)-
3-isovaleramido-5-pyrazolone

Into a one-liter three-necked flask equipped with a stirrer and a reflux condenser were placed 45 g. 1-(3-nitro-2,4,6-trimethylphenyl)-3-amino-5-pyrazolone and 500 ml. of absolute acetonitrile. The mixture was stirred and heated at 60° C. to dissolve the pyrazolone. To this solution was added 25 g. of isovaleryl chloride, and the mixture was refluxed for 15 hours. After the reaction was over, acetonitrile was distilled off under reduced pressure and the residue was dissolved in 400 ml. of a 5% aqueous sodium hydroxide solution with heating at 60° C. The solution was cooled to room temperature and solid matters were filtered away. Sixty ml. of acetic acid were added to the filtrate and the crystals thus precipitated were collected by suction, washed with water and recrystallized from ethanol. The yield was 25 g. and the melting point was 190°–192° C.

(b) 1-(3-amino-2,4,6-trimethylphenyl)-3-isovaler-
amido-5-pyrazolone

Into a five hundred-milliliter three-necked flask equipped with a stirrer and a reflux condenser were placed 25 g. of 1 - (3 - nitro - 2,4,6 - trimethylphenyl) - 3 - isovaleramido-5-pyrazolone, 120 ml. of methanol, and 150 ml. of acetic acid. The solution was stirred and heated to 60° C. to dissolve the pyrazolone. After gradually adding 25 g. of iron powder to the solution, the mixture was refluxed for 2 hours. After the reaction was over, the liquid was decanted into 1.5 liters of ice-water and the crystals thus precipitated were collected by suction, dissolved in 500 ml. of a 5% aqueous sodium hydroxide solution, and the solution was filtered. The filtrate was acidified by the addition of 50 ml.

glacial acetic acid and the crystals precipitated were collected, dried and recrystallized from acetonitrile. The amount of the product thus obtained was 12 g. and its melting point was 195–198° C.

(c) 1-[3-(2,4-di-t-amylphenoxyacetamido)-2,4,6-trimethylphenyl]-3-isovaleramido-5-pyrazolone Into a five-hundred milliliter three-necked flask equipped with a stirrer and a reflux condenser were placed 12 g. of 1 - (3 - amino - 2,4,6 - trimethylphenyl) - 3 - isovaleramido-5-pyrazolone and 260 ml. absolute of acetonitrile. The mixture was stirred and heated at 60° C. to dissolve the pyrazolone. After adding 12.5 g. of 2,4-di-t-amylphenoxyacetyl chloride to the solution the resulting mixture was refluxed for 13 hours. After the reaction was completed, acetonitrile was distilled off under reduced pressure and then the residue was dissolved in 250 ml. of methanol by heating. Fifteen g. of sodium acetate was added to the solution and the mixture was refluxed for 5 minutes. The product was poured into 1.3 liters of ice-water and the crystals precipitated were collected by suction, washed with water, dried, and recrystallized twice from acetonitrile. The amount of the product, melting at 132–134° C., was 11 g.

Elemental analysis.—Calculated: C, 71.2%; H, 8.47%; N, 9.49%. Found: C, 70.85%; H, 8.49%; N, 9.73%.

EXAMPLE 6 (SYNTHESIS OF COMPOUND 11)

(a) 1-(3-nitro-2,4,6-trimethylphenyl)-3-ethoxy-5-pyrazolone

Into a three-liter three-necked flask equipped with a stirrer, a reflux condenser, and thermometer were placed 145 g. of the hydrochloride of ethyl β-ethoxy-β-iminopropionate and 1.1 liters of methanol. The mixture was stirred and ice-cooled. Ninety-two g. of anhydrous sodium acetate and 10 ml. of glacial acetic acid were added to the mixture at a temperature of 10° C. and then 130 g. of 3-nitro-2,4,6-trimethylphenyl hydroazine was added to the mixture. The system was then allowed to react for 2 hours at 25° C. and for a further 30 minutes at 55–60° C. Then, after adding a solution of 80 g. of sodium methylate in 700 ml. of methanol, the mixture was refluxed for 3 hours. After the reaction was over, methanol, the mixture was distilled off under reduced pressure, the residue was dissolved in 1.3 liters of cold water (10° C.) and extracted in 800 ml. of ether. The aqueous phase was ice-cooled, and after adding thereto 60 ml. of acetic acid, the mixture was allowed to stand overnight. The crystals precipitated were collected by suction, washed with water, and recrystallized from isopropanol. The product amount to 103 g. and melted at 109–111° C.

Elemental analysis.—Calculated: C, 57.73%; H, 5.84%; N, 14.43%. Found: C, 57.83%; H, 5.90%; N, 14.42%.

(b) 1-(3-amino-2,4,6-trimethylphenyl)-3-ethoxy-5-pyrazolone 103 g. of 1-(nitro-2,4,6-trimethylphenyl)-3-ethoxy-5-pyrazolone and one liter of ethanol were placed in an autoclave and after adding therein 2 g. of a palladium-carbon catalyst (containing 10% palladium), the system was shaken for 5.5 hours under a pressure of 50 kg./cm.$^2$ hydrogen at 90° C. to absorb the necessary amount of hydrogen (1.06 moles). After standing to permit the system to cool, the catalyst was filtered off from the reaction mixture and the filtrate was concentrated under reduced pressure to precipitate crystals. After cooling the system, the crystals were suction-filtered and dried. The product amounted to 87 g. and melted at 190–191° C.

(c) 1-[3-(2,4-di-t-amylphenoxyacetamido)-2,4,6-trimethylphenyl]-3-ethoxy-5-pyrazolone Into a one-liter three-necked flask equipped with a stirrer and a reflux condenser were placed 30 g. of 1-(3-amino-2,4,6-trimethylphenyl)-3-ethoxy-5-pyrazolone and 500 ml. of water-free acetonitrile and after adding to the solution 38 g. of 2,4-di-t-amylphenoxyacetyl chloride with stirring, the mixture was refluxed for 11 hours. After 11 hours acetonitrile was distilled off under reduced pressure and the residue was dissolved in 300 ml. of methanol by heating at 60° C. After adding to the solution 15 g. of sodium acetate, the mixture was boiled for 5 minutes and then the product was poured into two liters of ice-water. The crystals thus precipitated were collected by suction and dissolved in 600 ml. of ether. The aqueous phase which formed was removed. The ether solution was dried over sodium sulfate, filtered and then the ether was distilled off under reduced pressure. The residue was dissolved in a mixture of n-hexane and ligroin (2:1) by heating (reflux temperature) and the solution was then allowed to cool to room temperature. The crystals thus precipitated were collected by suction and recrystallized from a mixture of n-hexane and ligroin. The amount of the product was 21 g., and the melting point thereof was 161–163° C.

Elemental analysis.—Calculated: C, 71.78%; H, 8.41%; N, 7.85%. Found: C, 71.71%; H, 8.63%; N, 7.56%.

EXAMPLE 7 (SYNTHESIS OF COMPOUND 12)

Synthesis of 1-{3-[α-(2,4-di-t-amylphenoxy)butyramido]-2,4,6-trimethylphenyl}-3-ethoxy-5-pyrazolone Into a one-liter three-necked flask equipped with a stirrer and a reflux condenser were placed 70 g. of 1-(3-amino-2,4,6-trimethyl-phenyl)-3-ethoxy-5-pyrazolone and 700 ml. of absolute acetonitrile and the suspension was stirred and heated to 60° C. to yield a clear solution. After adding to the solution 95 g. of α-(2,4-di-t-amylphenoxy) butyryl chloride, the mixture was refluxed for 15 hours. The mixture was allowed to cool to room temperature whereby the hydrochloride of the product precipitated and was collected, dissolved in 800 ml. of warm methanol (50° C.) and the resulting solution was cooled to room temperature. To the solution there was added 150 ml. of a 10% aqueous sodium hydroxide solution, the mixture was stirred for one hour, and the product was poured into 4 liters of ice-water containing 60 ml. of glacial acetic acid. The crystals which precipitated were collected by suction, dissolved in one liter of ether, and the aqueous phase which formed was removed. The ether layer was dried over sodium sulfate, filtered, and then ether was distilled off from the ether filtrate under reduced pressure. The residue was dissolved in 300 ml. of n-hexane with heating at the reflux temperature and after allowing the solution to cool to room temperature the crystals which precipitated were collected and recrystallized from n-hexane. The yield of product crystals was 52 g., and the melting point of the product was 123–125° C.

Elemental analysis.—Calculated: C, 72.46%; H, 8.7%; N, 7.46. Found: C, 72.22%; H, 8.65%; N, 7.7%.

We claim:
1. A Magenta color coupler of the formula

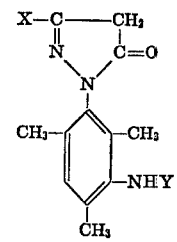

wherein X represents ethoxy or acylamino wherein said acyl is selected from the group consisting of lower alkanoyl, benzoyl optionally substituted with lower alkyl,

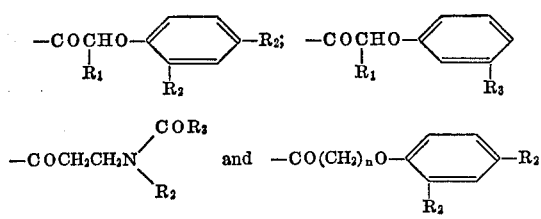

wherein $R_1$ represents hydrogen or alkyl of not more than 3 carbon atoms, $R_2$ represents alkyl of not more than 5 carbon atoms, $R_3$ represents alkyl of from 5 to 16 carbon atoms, and $n$ is an interger from 2 to 5; wherein Y represents hydrogen or acyl selected from the group consisting of lower alkanoyl, benzoyl optionally substituted with lower alkyl,

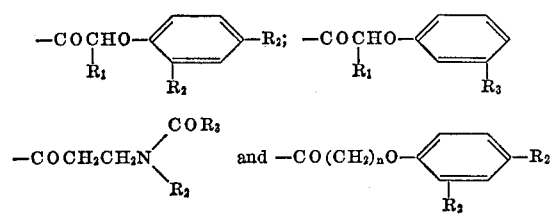

wherein $R_1$, $R_2$ and $R_3$ and $n$ have the significance set forth above; and wherein at least one of X or Y contains from 17 to 25 carbon atoms.

2. The couplers of Claim 1 where X is acylamino.
3. The couplers of Claim 1 where X is ethoxy.
4. The couplers of Claim 1 where Y is hydrogen.
5. The couplers of Claim 1 where Y is acyl.
6. The couplers of Claim 1 where X contains 17 to 25 carbon atoms.
7. The couplers of Claim 1 where Y contains 17 to 25 carbon atoms.
8. The couplers of Claim 1, wherein the one of X or Y containing from 17 to 25 carbon atoms contains substituted phenyl.
9. The couplers of Claim 8, wherein the one of X or Y containing from 17 to 25 carbon atoms contains N-alkyl amido.

References Cited
UNITED STATES PATENTS

| | | | |
|---|---|---|---|
| 2,068,824 | 1/1937 | Schönhöfer et al. | 260—310 A |
| 2,472,109 | 6/1949 | Hindermann | 260—310 A |
| 3,212,894 | 10/1965 | Menzel et al. | 260—310 A |
| 2,899,443 | 8/1959 | Schulze | 96—100 |
| 3,658,544 | 4/1972 | Iwama et al. | 96—100 |
| 3,062,653 | 11/1962 | Weissberger et al. | 260—310 A |
| 3,558,319 | 1/1971 | Hamaoka et al. | 260—310 A |
| 3,677,764 | 7/1972 | Glockner et al. | 96—100 |
| 3,684,514 | 8/1972 | Iwama et al. | 260—310 A |
| 2,710,871 | 6/1955 | Graham | 260—310 A |
| 2,637,732 | 5/1953 | Schmid et al. | 260—310 A |
| 2,772,971 | 12/1956 | Sprung et al. | 96—100 |

OTHER REFERENCES

Noller: Chemistry of Organic Compounds 2nd ed. pp. 237 and 479, Philadelphia, Saunders, 1957.

NATALIE TROUSOF, Primary Examiner

U.S. Cl. X.R.
96—56.5, 100

UNITED STATES PATENT OFFICE
CERTIFICATE OF CORRECTION

Patent No. 3,824,250            Dated July 16, 1974

Inventor(s) Masao Sawahara et al

It is certified that error appears in the above-identified patent and that said Letters Patent are hereby corrected as shown below:

IN THE CLAIMS:

Please add Claim 10, originally presented in a Rule 312 Amendment as Claim 15, as follows:

--10. A magenta color coupler of the formula

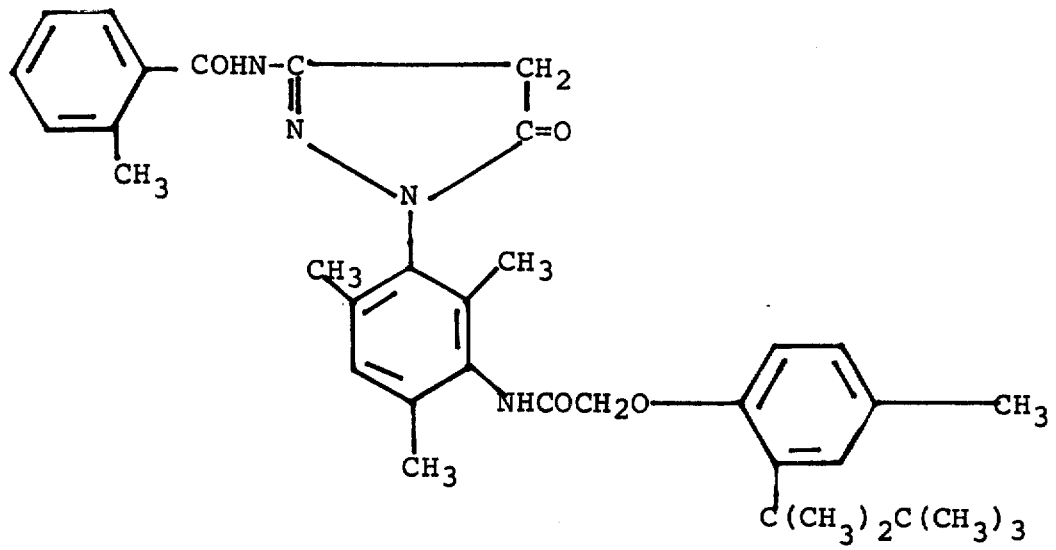

Signed and sealed this 15th day of April 1975.

(SEAL)
Attest:

RUTH C. MASON
Attesting Officer

C. MARSHALL DANN
Commissioner of Patents
and Trademarks